United States Patent [19]

Cooke

[11] Patent Number: 4,492,788

[45] Date of Patent: Jan. 8, 1985

[54] PARTIALLY DEACYLATED ULTRA-HIGH MOLECULAR WEIGHT POLY(N-PROPIONYLETHYLENIMINES)

[75] Inventor: Robert S. Cooke, Morris Plains, N.J.

[73] Assignee: Allied Corporation, Morris Township, Morris County, N.J.

[21] Appl. No.: 455,093

[22] Filed: Jan. 3, 1983

[51] Int. Cl.$^3$ .............................................. C08G 73/00
[52] U.S. Cl. .................................. 525/410; 525/411; 525/540; 528/417; 528/423; 528/424
[58] Field of Search ....................... 525/410, 411, 540; 528/417, 423, 424

[56] References Cited

U.S. PATENT DOCUMENTS 3,483,141 12/1969 Litt et al. ............................ 528/423
3,833,521 9/1974 Karbstein et al. .................. 525/417
4,104,228 8/1978 Meyer et al. ........................ 525/410

OTHER PUBLICATIONS

Kenneth M. Kem, "Kinetics of the Hydrolysis of Linear Poly[(acylimino)ethylenes]," Journal of Polymer Science: Polymer Chemistry Edition, vol. 17, 1977-1990, (1979).

Primary Examiner—Harold D. Anderson
Attorney, Agent, or Firm—Alan M. Doernberg; Gerhard H. Fuchs; Kenneth E. Stroup

[57] ABSTRACT

Ultra-high molecular weight poly(N-propionylethylenimines) are disclosed that are useful as water purification agents. The polymers of this invention include partially deacylated poly(N-propionylethylenimines) derived from poly(N-propionylethylenimines) having a weight average molecular weight, $\overline{M}_w$, between about 1 million and about 20 million. The polymers have a degree of deacylation that ranges from about 10% to about 90%.

9 Claims, No Drawings

PARTIALLY DEACYLATED ULTRA-HIGH MOLECULAR WEIGHT POLY(N-PROPIONYLETHYLENIMINES)

BACKGROUND OF THE INVENTION

The present invention relates to ultra-high molecular weight polymers which are particularly useful as water purification agents. More specifically, the polymers of this invention include partially deacylated poly(N-propionylethylenimines) derived from poly(N-propionylethylenimines) having a weight average molecular weight, $\overline{M}_w$, between about 1 million and about 20 million.

U.S. Pat. No. 3,483,141 discloses poly(N-propionylethylenimines) having reduced viscosities between about 0.6 dL/g and about 6.2 dL/g in m-cresol at 25° C.

U.S. Pat. No. 3,833,521 (Karbstein and Scheppers, 1974) discloses a transamidation process for partial deacylation of poly(N-acylalkylenimines) of the formula

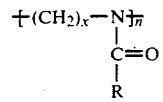

wherein x is 2 or 3, n is an integer of 10–5,000 and R is a variety of substituents, including alkyl moieties of 1–12 carbon atoms. Karbstein and Scheppers disclose at column 4, line 7, that the deacylated products are useful as auxiliary agents for water treatment. Thus, in view of the structure disclosed by Karbstein and Scheppers, and in view of one of the disclosed uses for the deacylated poly(N-acylalkylenimines), U.S. Pat. No. 3,833,521 discloses that partially deacylated poly(N-propionylethylenimines) are useful as water treatment agents. However, the partially deacylated products of U.S. Pat. No. 3,833,521 are derived from polymers whose $\overline{M}_w$ is no greater than about 500,000 where R is ethyl. Furthermore, the preferred molecular weight of the precursor polymeric material in U.S. Pat. No. 3,833,521 is only about 30,000 to about 130,000 when poly(N-propionylethylenimines) are employed as precursor polymers. As noted above, the weight average molecular weight of the poly(N-propionylethylenimines) of the present invention from which the deacylated polymers of this invention are derived is between about 1 million and about 20 million.

BRIEF DESCRIPTION OF THE INVENTION

This invention relates to a partially deacylated polymer produced via deacylation of a polymer whose polymeric structure consists essentially of repeat units having the structure

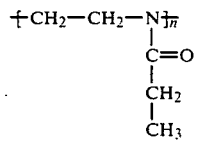

wherein said partially deacylated polymer has the structure

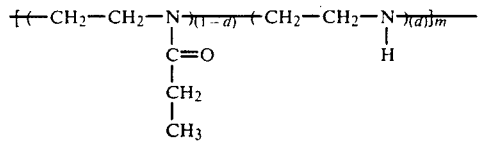

wherein m is between about 5,000 and about 200,000, and wherein d represents the degree of deacylation and is between about 0.1 and about 0.9.

DETAILED DESCRIPTION OF THE INVENTION

We have discovered ultra-high molecular weight partially deacylated poly(N-propionylethylenimines) which are useful as water purification agents. The novel partially deacylated polymers of this invention are derived from novel ultra-high molecular weight poly(N-propionylethylenimines) of structure I as follows:

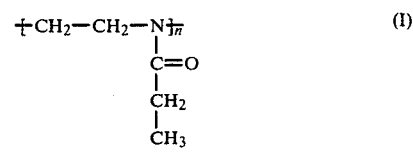

wherein n is between about 10,000 and about 200,000. More particularly, the deacylated polymers may be represented by structure II as follows:

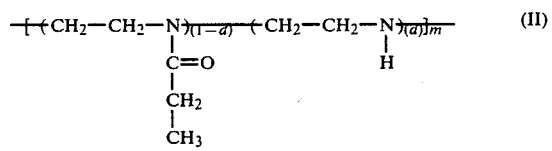

wherein m is between about 5,000 and about 200,000 and wherein d is between about 0.1 and 0.9 (i.e., about 10% to about 90% deacylation). Thus, the partially deacylated poly(N-propionylethylenimines) of this invention are prepared via a two stage process. The first stage of the process involves the polymerization of 2-ethyl-2-oxazoline to ultra-high molecular weight poly(N-propionylethylenimine). The second stage of the process involves the partial deacylation of said poly(N-propionylethylenimine).

The monomer which is employed in this invention, 2-ethyl-2-oxazoline, may be obtained by various known procedures. For example, it may be prepared by cyclization of a hydroxyalkyl amide of the formula

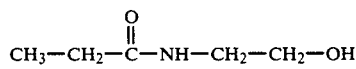

in accordance with the procedures described by Litt et al. in U.S. Pat. No. 3,681,333 (Allied Corp., 1969). The monomer may also be obtained by cyclodehydrohalogenation of a chloroalkyl amide of the formula

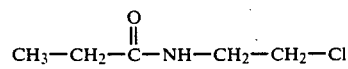

by treating said amide with sodium hydroxide in accordance with known procedures. The monomer is also commercially available.

Irrespective of the method employed to obtain 2-ethyl-2-oxazoline, it is desirable to purify this monomeric material as much as possible via distillation procedures. It is believed that the high molecular weights of the intermediate poly(N-propionylethylenimines) of this invention are in part a function of the purity of the monomer. Higher molecular weight poly(N-propionylethylenimines) are obtained upon polymerization of 2-ethyl-2-oxazoline when the monomer is essentially pure and uncontaminated. Essentially pure and uncontaminated 2-ethyl-2-oxazoline may be obtained by distillation at least once from a suitable drying agent under a dry and inert atmosphere such as nitrogen or argon in accordance with procedures known to those having skill in the art. Suitable drying agents which may be employed in purification of 2-ethyl-2-oxazoline include sodium metal, sodium benzophenone ketyl, bis(2-ethylhexyl)hydrogen phosphite and other similar materials.

The polymerization process of this invention may be initiated once 2-ethyl-2-oxazoline has been purified. In general, the polymerization reaction of this invention may be illustrated by reaction 1 as follows:

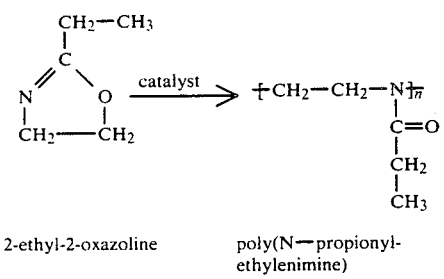

2-ethyl-2-oxazoline   poly(N—propionylethylenimine)

(1)

wherein n is the average degree of polymerization and is between about 10,000 and about 200,000. In view of the average degree of polymerization, the intermediate poly(N-propionylethylenimines) of this invention have a weight average molecular weight between about 1 million and about 20 million. Example 4 of this application illustrates the synthesis of a poly(N-propionylethylenimine) whose weight average molecular weight has been determined to be about 13.7 million by light scattering techniques.

In accordance with reaction 1 as illustrated above, polymerization of 2-ethyl-2-oxazoline to ultra-high molecular weight poly(N-propionylethylenimine) is accomplished by heating in the presence of a suitable catalyst. Catalysts which may be employed in this invention include electrophilic compounds such as alkyl halides, boron fluorine compounds, antimony fluorine compounds, strong acids, salts of strong acids with an oxazoline, esters of strong acids or other similar compounds. Illustrative examples of these generic catalysts which may be employed include methyl iodide, 1,4-dibromobutane, boron trifluoride, antimony pentafluoride, p-toluene sulfonic acid, sulfuric acid, perchloric acid, dimethyl sulfate, methyl p-toluene sulfonate, ethylene glycol bis(p-toluene sulfonate), 2-phenyl-2-oxazolinium perchlorate, 2-phenyl-2-oxazolinium trifluoromethane sulfonate, and 2-(p-chlorophenyl)-2-oxazolinium perchlorate and other similar catalysts described in U.S. Pat. No. 3,483,141. The preferred catalysts for conducting the polymerization step of this invention are 2-phenyl-2-oxazolinium perchlorate, 2-phenyl-2-oxazolinium trifluoromethane sulfonate and ethylene glycol bis(p-toluene sulfonate).

The amount of catalyst employed may vary over a wide range. For example, a monomer to initiator (i.e., catalyst) molar ratio of about 5,000 to about 50,000 may be employed in the process of this invention to produce the intermediate poly(N-propionylethylenimines) which are subsequently deacylated in order to produce the novel and useful water treatment agents. It is not possible to state that a particular monomer to initiator molar ratio will produce an intermediate polymer having a particular molecular weight. This is due to the fact that the molecular weight obtained for a given polymerization is also a function of the purity of the monomer, polymerization temperature, and polymerization time. However, in general, the molecular weight of the intermediate polymers increases as the monomer/initiator molar ratio is increased.

The polymerization step of this invention may be accomplished by employing various reaction times and temperatures in one or more stages. One method for conducting the polymerization step is a two stage process wherein 2-ethyl-2-oxazoline is heated in the presence of added catalyst at a temperature between about 70° C. and 130° C. for a period of time between about 16 hours and 96 hours to form a reaction mixture comprising partially polymerized 2-ethyl-2-oxazoline and catalyst. In order to complete the polymerization, the resultant reaction mixture is then heated for about 16 hours to about 48 hours at a temperature which is about 20° C. to about 80° C. above the temperature of the initial polymerization stage.

It is preferred, however, to utilize a two stage polymerization process that utilizes shorter reaction times. The first stage of the preferred two stage polymerization involves heating 2-ethyl-2-oxazoline in the presence of a suitable catalyst at a temperature between about 90° C. and about 150° C. for a period of time between about 3 hours and about 16 hours. In many preferred embodiments of this invention, this initial polymerization stage is conducted at a temperature between about 120° C. and about 140° C. for a period of time between about 6 hours and about 9 hours. The described initial polymerization stage of the preferred two stage polymerization process produces a reaction mixture comprising polymerized 2-ethyl-2-oxazoline, unreacted monomeric 2-ethyl-2-oxazoline and catalyst. The second stage of this preferred polymerization process involves heating the reaction mixture at a temperature between about 200° C. and about 250° C. for a period of time between about 0.05 and about 10 hours to produce ultra-high molecular weight poly(N-propionylethylenimine) having a weight average molecular weight between about 1 million and about 20 million. In many preferred embodiments of this invention, the second polymerization stage of the preferred two stage polymerization process is conducted at a temperature between about 220° C. and about 250° C. for about 3 to about 20 minutes. The described second heating step may be conducted in the same polymerization vessel as the first heating step. Alternatively and most preferably, however, the second heating step should be conducted in continuous fashion in an extruder in accordance with the general procedures described in Canadian Pat. No. 863,417 (Allied Corp., 1971).

As noted above, the intermediate poly(N-propionylethylenimines) of this invention have a weight average molecular weight between about 1 million and about 20 million as determined by light scattering analytical techniques. In view of this molecular weight, and as previously illustrated, the intermediate polymers may be represented as follows:

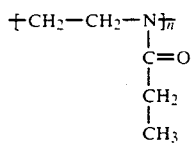

wherein n is the average degree of polymerization and is between about 10,000 and about 200,000. Once this intermediate polymer has been obtained, the partially deacylated poly(N-propionylethylenimine) water treatment polymers may be produced in accordance with known partial deacylation procedures such as hydrolysis or transamidation.

In the preferred embodiments of this invention, the average degree of polymerization (i.e., n) is between about 20,000 and about 200,000, with about 40,000 to about 140,000 being an especially preferred average degree of polymerization.

The preferred method of partial deacylation involves partial hydrolysis of ultra-high molecular weight poly(N-propionylethylenimines) via reaction 2 as follows:

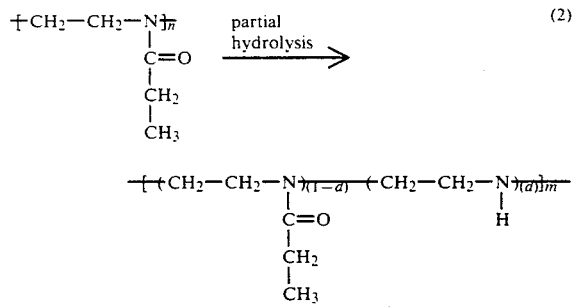

wherein m is between about 5,000 and about 200,000 and wherein d represents the degree of deacylation and is between about 0.1 and 0.9 (i.e., about 10% to about 90% deacylation). In the preferred embodiments of this invention, m is between about 10,000 and about 200,000, with about 20,000 to about 140,000 being especially preferred. Additionally, in many other preferred embodiments of this invention, d is between about 0.2 and about 0.8, with about 0.2, 0.5 and about 0.7 being especially preferred.

The partial hydrolysis step represented by reaction (2) above may easily be accomplished by employing acid or base catalyzed hydrolysis. Hydrolysis is more easily controlled under acidic conditions and, thus, acid hydrolysis is preferred. An article by K. M. Kem, entitled "Kinetics of the Hydrolysis of Linear Poly[-(acylimino)ethylenes]" in the Journal of Polymer Science, Polymer Chemistry Edition, Vol. 17, 1977-1990 (1979), describes controlled acid hydrolysis for various poly[(acylimino)ethylenes], including poly(N-propionylethylenimine), and to that extent, the article is herein incorporated by reference.

EXAMPLE 1

A sample of 2-ethyl-2-oxazoline was distilled under an argon blanket twice through a 40-cm vacuum-jacketed column packed with 5×5 mm Raschig rings. A single pellet of sodium hydroxide was added during the first rectification, and the second distillation was from an excess of sodium metal. Two additional distillations from sodium benzophenone ketyl were performed in the same fractionating column at reduced pressure. During the final purification, 96 g (0.96 mol) monomer boiling at 66° C./10.6 kPa were collected. A 12.5-mg (0.05 mmol) portion of 2-phenyl-2-oxazolinium perchlorate was added as catalyst. Several 1-mL ampules were charged with this solution, degassed during a single freeze-pump-thaw cycle, and sealed while frozen and evacuated.

The tubes were heated in an oil bath for various times at several temperatures in the range 130°–220° C. After cooling to room temperature, the ampules were crushed, and the poly(N-propionylethylenimine) was dissolved in water, filtered and freeze dried. Reduced viscosities of 0.52% (w/v) solutions in m-cresol were measured at 25° C. These data are shown in the tables below.

TABLE I

| Reduced Viscosities of Poly(N—propionylethylenimine) Prepared at Various Temperatures | |
|---|---|
| polymerization temperature, time[a] | $\eta_{sp}/c$, dL/g |
| 130° C., 72 hours | 8.18 |
| 170° C., 18 hours | 6.31 |
| 220° C., 2 hours | 3.62 |

[a]Following polymerization for the tabulated time and temperature, all samples were heated an additional 2 hours at 220° C.

TABLE II

| Reduced Viscosities of Poly(N—propionylethylenimine) Prepared in Two Stages at 130 and 220° C. | |
|---|---|
| time at 130° C.[a] | $\eta_{sp}/c$, dL/g |
| 0 hours | 3.62 |
| 4 hours | 6.22 |
| 8 hours | 8.44 |
| 12 hours | 8.38 |

[a]Following polymerization for the tabulated time and temperature, all samples were heated an additional 4 hours at 220° C.

The data in Table II illustrate that the deleterious effect on molecular weight can be eliminated by first conducting the reaction for several hours at low temperature before raising the temperature to the final value.

EXAMPLE 2

A sample of 2-ethyl-2-oxazoline was distilled under an argon blanket three times through a 40-cm vacuum-jacketed column packed with 5×5 mm Raschig rings. A single pellet of sodium hydroxide was added during the first rectification, and subsequent distillations were from an excess of sodium metal. In the final purification stage, 695 g (7.01 mol) monomer were collected directly in a 2000-mL three-necked flask fitted with a mechanical stirring paddle/water-cooled bearing, an argon inlet tube, and a reflux condenser topped with another argon inlet tube.

An argon blanket was maintained throughout the polymerization reaction. A 65.4-mg (0.18 mmol) portion of ethylene glycol bis(p-toluenesulfonate) was added as catalyst, and the reaction flask was immersed in an oil bath at 150° C. Stirring was continued for 9 hours until the solution became very viscous, and the quiescent reaction mixture was then heated in the oil bath at 150°–165° C. for an additional 63 hours.

The reaction mixture was cooled to room temperature. Upon immersion of the flask in liquid nitrogen, it was possible to break the polymer mass into smaller fragments which were dissolved in 3500 mL water with stirring over five days. The viscous solution was filtered at the water aspirator through a coarse sintered glass frit with 100-mL water rinse to give 3690 g of filtrate. A 6.63-g sample of filtered poly(N-propionylethylenimine) solution was diluted with water and freeze dried to give 1.21 g of white solid. Based on isolation of an 18.3% (w/w) solution weighing 3690 g, the yield of polymer was 674 g or 97.0% of theoretical. On this scale substantial losses are incurred upon filtration and transfer of the viscous solution.

The freeze dried sample was further dried in vacuo at 50° C. for two hours. The reduced viscosity of a 0.50% (w/v) solution in m-cresol measured at 25° C. was $\eta_{sp}/c = 5.53$ dL/g. Based upon light scattering molecular weight determinations, the estimated weight average molecular weight of this material was $\overline{M}_w = 1.12 \times 10^6$.

EXAMPLE 3

A sample of 2-ethyl-2-oxazoline was distilled under an argon blanket twice through a 90-cm vacuum-jacketed column packed with 3.2-mm glass helices. A few milliliters of bis(2-ethylhexyl)hydrogen phosphite were added prior to the second rectification. A 230-g (2.32 mol) portion of monomer was collected, and 114.7 mg (0.46 mmol) 2-phenyl-2-oxazolinium perchlorate was added as catalyst. Several 100-mL ampules were charged with the resulting solution, frozen in liquid nitrogen, evacuated, and sealed.

The tubes were heated in an oil bath at 110° C. for 24 hours, and then at 160° C. for an additional 24 hours. After cooling to room temperature, it was possible to recover the poly(N-propionylethylenimine) by shattering the glass ampules upon immersion in liquid nitrogen. The polymer was dissolved in water, filtered, freeze dried, and further dried in vacuo at 60° C. overnight. The reduced viscosity of a 0.52% (w/v) solution in m-cresol measured at 25° C. was $\eta_{sp}/c = 7.16$ dL/g. Based upon a light scattering molecular weight determination, the measured weight average molecular weight of this material was $\overline{M}_w = 2.12 \times 10^6$.

EXAMPLE 4

An 11.9-mg (0.05 mmol) portion of 2-phenyl-2-oxazolinium perchlorate was dissolved in 232 g (2.34 mol) 2-ethyl-2-oxazoline which had been purified as described in Example 1. Several 100-mL ampules were charged with this solution, degassed during a single freeze-pump-thaw cycle, and sealed while frozen and evacuated.

The tubes were heated in an oil bath at 130° C. for 24 hours and then at 160° C. for an additional 47 hours. The polymer was isolated and purified as described in Example 3. The reduced viscosity of a 0.52% (w/v) solution in m-cresol at 25° C. was $\eta_{sp}/c = 14.1$ dL/g. Based upon a light scattering molecular weight determination, the measured weight average molecular weight of this material was $\overline{M}_w = 1.37 \times 10^7$.

EXAMPLE 5

A 29.0-mg (0.12 mmol) portion of 2-phenyl-2-oxazolinium perchlorate was dissolved in 232 g (2.34 mol) 2-ethyl-2-oxazoline which had been purified as described in Example 1. Several 100-ml ampules were charged with this solution, degassed during a single freeze-pump-thaw cycle, and sealed while frozen and evacuated.

The tubes were heated in an oil bath at 130° C. for 24 hours and then at 160° C. for an additional 24 hours. The polymer was isolated and purified as described in Example 3. The reduced viscosity of a 0.52% (w/v) solution in m-cresol at 25° C. was $\eta_{sp}/c = 11.4$ dL/g. Based upon a light scattering molecular weight determination, the measured weight average molecular weight of this material was $\overline{M}_w = 4.00 \times 10^6$.

COMPARATIVE EXAMPLE 6

A 1.40-g (5.67 mmol) portion of 2-phenyl-2-oxazolinium perchlorate was dissolved in 281 g (2.83 mol) 2-ethyl-2-oxazoline which had been purified as described in Example 1. Several 100-mL ampules were charged with this solution, degassed during a single freeze-pump-thaw cycle, and sealed while frozen and evacuated.

The tubes were heated in an oil bath at 70° C. for 24 hours and then at 130° C. for an additional 24 hours. The polymer was isolated and purified as described in Example 3. The reduced viscosity of a 0.52% (w/v) solution in m-cresol at 25° C. was $\eta_{sp}/c = 0.93$ dL/g. Based upon a light scattering molecular weight determination, the measured weight average molecular weight of this material was $\overline{M}_w = 8.87 \times 10^4$.

EXAMPLE 7

Equipment for hydrolysis comprised a 500-mL three-necked flask fitted with a mechanical stirring paddle/water-cooled bearing and a three-bulb vacuum-jacketed Snyder column topped with an automatic reflux/takeoff distillation head and an argon inlet. The reactor was charged with 35.6 g (0.36 mol) poly(N-propionylethylenimine) prepared as described in Example 5, 152.5 g water, and 7.5 mL (0.09 mol) concentrated hydrochloric acid. Heating in an oil bath was continued for 6.0 hours while 146.8 g distillate containing 2.8 g propionic acid was collected at a reflux/takeoff ratio of 10/1. The reaction mixture was cooled to room temperature, diluted with water, and neutralized with Amberlite ® IRA 900 strong base ion exchange resin in the hydroxide ion form. The resin was filtered and washed repeatedly with water. The filtrate was filtered to remove slight turbidity. A 59.9-g portion was freeze dried and further dried in vacuo at 60° C. to give 1.8 g of product. Based on isolation of a 2.9% (w/w) solution weighing 1013 g, the yield of partially hydrolyzed poly(N-propionylethylenimine) was 29.6 g or 96.6% of theoretical.

The 200 MHz $^1$H NMR spectrum of the isolated polymer in chloroform-d was examined. Methylene protons adjacent to tertiary amide centers give rise to a broad, unresolved signal centered at 3.5δ. Upfield resonances near 2.8δ are due to methylene protons next to secondary amine groups. Measurement of the appropriate ratio of integrals provides a measure of the extent of hydrolysis, which for this sample was d=0.244. The reduced viscosity of a 0.47% (w/v) solution in chloroform measured at 25° C. was $\eta_{sp}/c = 3.95$ dL/g. Based upon a light scattering molecular weight determination, the measured weight average molecular weight of this material was $\overline{M}_w = 3.30 \times 10^6$.

EXAMPLE 8

Equipment for hydrolysis comprised a 1000-ml three-necked flask fitted with a mechanical stirring paddle/water-cooled bearing and a reflux condenser topped with an argon inlet. The reactor was charged with 54.4 g (0.55 mol) poly(N-propionylethylenimine) prepared as described in Example 5, 304.0 g water and 15.7 mL (0.19 mol) concentrated hydrochloric acid. The mixture was stirred at reflux for 3.3 hours in an oil bath.

The reaction mixture was cooled to room temperature and made strongly basic by the addition of aqueous sodium hydroxide. A tube-in-shell dialysis unit was employed to remove residual reactants and by-products. The partially hydrolyzed poly(N-propionylethylenimine) was recirculated through semi-permeable hollow fibers while distilled water was run in a countercurrent fashion. The purification procedure was monitored by measuring the conductivity of the wash water effluent stream. The retentate was reduced in volume on a rotary evaporator. A 10.7-g portion of this solution was freeze dried and further dried in vacuo at 60° C. to give 0.8 g of product. Based on isolation of a 7.35% (w/w) solution weighing 637.0 g, the yield of partially hydrolyzed poly(N-propionylethylenimine) was 46.8 g or 96.6% of theoretical. NMR analysis indicated that the degree of hydrolysis was $d = 0.194$.

EXAMPLE 9

The equipment and procedures described in Example 8 were employed except as noted. A charge of 55.4 g (0.56 mol) poly(N-propionylethylenimine) prepared as described in Example 5, 308.9 g water and 46.9 mL (0.57 mol) concentrated hydrochloric acid was stirred at reflux for 3.0 hours. Following purification and isolation, NMR analysis indicated that the degree of hydrolysis was $d = 0.532$.

EXAMPLE 10

The equipment and procedures described in Example 8 were employed except as noted. A charge of 53.3 g (0.54 mol) poly(N-propionylethylenimine) prepared as described in Example 5, 297.4 g water and 59.8 mL (0.73 mol) concentrated hydrochloric acid was stirred at reflux for 3.8 hours. A slurry of partially hydrolyzed poly(N-propionylethylenimine) was obtained upon neutralization, nonetheless, it was possible to purify and isolate the product following the usual procedures. NMR analysis indicated that the degree of hydrolysis was $d = 0.738$.

COMPARATIVE EXAMPLE 11

The equipment and procedures described in Example 8 were employed except as noted. A charge of 52.2 g (0.53 mol) poly(N-propionylethylenimine) prepared as described in Comparative Example 6, 290.2 g water and 15.0 mL (0.18 mol) concentrated hydrochloric acid was stirred at reflux for 3.3 hours. Following purification and isolation, NMR analysis indicated that the degree of hydrolysis was $d = 0.202$.

COMPARATIVE EXAMPLE 12

The equipment and procedures described in Example 8 were employed except as noted. A charge of 55.1 g (0.56 mol) poly(N-propionylethylenimine) prepared as described in Comparative Example 6, 308.5 g water and 46.7 mL (0.57 mol) concentrated hydrochloric acid was stirred at reflux for 3.0 hours. Following purification and isolation, NMR analysis indicated that the degree of hydrolysis was $d = 0.544$.

COMPARATIVE EXAMPLE 13

The equipment and procedures described in Example 8 were employed except as noted. A charge of 59.0 g (0.59 mol) poly(N-propionylethylenimine) prepared as described in Comparative Example 6, 329.3 g water and 66.3 mL (0.81 mol) concentrated hydrochloric acid was stirred at reflux for 3.8 hours. A slurry of partially hydrolyzed poly(N-propionylethylenimine) was obtained upon neutralization, nonetheless, it was possible to purify and isolate the product following the usual procedures. NMR analysis indicated that the degree of hydrolysis was $d = 0.762$.

EXAMPLE 14

A sample of API separator underflow obtained from an oil refinery was adjusted to pH 6.1. A neutral, aqueous solution of partially hydrolyzed poly(N-propionylethylenimine) prepared as described in Example 8 was added to the oily waste and mixed rapidly for several minutes. Stirring was stopped, and the clarity of the aqueous layer was judged. An optimum dose of 5 ppm polymer gave a completely clear water layer. A similar test employing an optimum dose of 6 ppm partially hydrolyzed poly(N-propionylethylenimine) prepared as described in Comparative Example 11 gave a turbid aqueous layer, that is, only a slight change from the blank to which no polymer was added.

EXAMPLE 15

A sample of waste activated sludge obtained from a sewage treatment plant contained 0.63% (w/w) solids at pH 7.0. A neutral aqueous solution of partially hydrolyzed poly(N-propionylethylenimine) prepared as described in Example 9 was added to the sludge with agitation. Gravity filtration was observed in a 5.5-cm diameter Buchner funnel fitted with Trigger ® cloth. At an optimum dose of 50 ppm polymer, a standard plot of time per filtrate volume versus filtrate volume gave a slope of $b = 1.33 \times 10^{-2}$ s/mL$^2$. Data from a similar test employing an optimum dose of 50 ppm partially hydrolyzed poly(N-propionylethylenimine) prepared as described in Comparative Example 12 was plotted to give a slope of $b = 3.62 \times 10^{-2}$ s/mL$^2$.

At a similar dose, sludge treated with the polymer of the present invention exhibited approximately one-third the specific filter resistance observed when conditioned with low molecular weight partially hydrolyzed poly(N-propionylethylenimine).

EXAMPLE 16

A sample of gravity-thickened primary sludge blended with waste activated sludge obtained from a sewage treatment plant contained 3.94% (w/w) solids at pH 5.9. A neutral, aqueous solution of partially hydrolyzed poly(N-propionylethylenimine) prepared as described in Example 10 was added to the sludge with agitation. Gravity filtration was observed in a 5.5-cm diameter Buchner funnel fitted with Trigger ® cloth. At 100 ppm, which was the minimum dose of polymer applied, a standard plot of time per filtrate volume versus filtrate volume gave a slop of $b = 6.08 \times 10^{-2}$ s/mL$^2$. Data from a similar test employing an optimum dose of 250 ppm partially hydrolyzed poly(N-propionylethylenimine) prepared as described in Comparative Example 13 was plotted to give a slope of $b = 3.44 \times 10^{-1}$ s/mL$^2$.

At less than half the dose, sludge treated with the polymer of the present invention exhibits about one-fifth the specific filter resistance observed when conditioned with low molecular weight partially hydrolyzed poly(N-propionylethylenimine).

We claim:

1. A partially deacylated polymer produced via deacylation of a polymer having a polymeric structure consisting essentially of repeat units having the structure

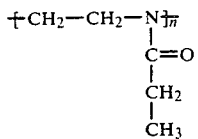

wherein said partially deacylated polymer is represented by the structure

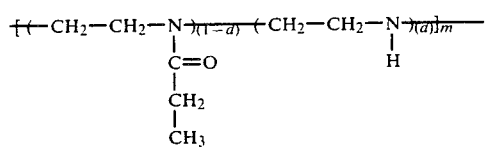

wherein m is between about 5,000 and about 200,000; wherein n is between about 10,000 and about 200,000 and wherein d represents the degree of deacylation and is between 0.1 and 0.9.

2. A partially deacylated polymer in accordance with claim 1 wherein d is between about 0.2 and about 0.8.

3. A partially deacylated polymer in accordance with claim 1 wherein m is between about 10,000 and about 200,000.

4. A partially deacylated polymer in accordance with claim 3 wherein d is between about 0.2 and about 0.8.

5. A partially deacylated polymer in accordance with claim 4 wherein m is between about 20,000 and about 140,000.

6. A partially deacylated polymer in accordance with claim 4 wherein m is about 40,000.

7. A partially deacylated polymer in accordance with claim 3 wherein d is about 0.2.

8. A partially deacylated polymer in accordance with claim 3 wherein d is about 0.5.

9. A partially deacylated polymer in accordance with claim 3 wherein d is about 0.7.

* * * * *